US009652786B2

(12) United States Patent
Goulden et al.

(10) Patent No.: US 9,652,786 B2
(45) **Date of Patent: *May 16, 2017**

(54) ATTRIBUTING AND ALLOCATING ADVERTISING REVENUE FOR EMBEDDED SOFTWARE

(71) Applicant: Gula Consulting Limited Liability Company, Dover, DE (US)

(72) Inventors: David L. Goulden, Redwood City, CA (US); Charles Gilbert, San Jose, CA (US); Craig Zeldin, Redwood City, CA (US)

(73) Assignee: Gula Consulting Limited Liability Company, Dover, DE (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/156,494

(22) Filed: Jan. 16, 2014

(65) Prior Publication Data

US 2014/0129304 A1 May 8, 2014

Related U.S. Application Data

(63) Continuation of application No. 11/368,858, filed on Mar. 6, 2006, now Pat. No. 8,645,941.

(60) Provisional application No. 60/659,682, filed on Mar. 7, 2005.

(51) Int. Cl.

| | |
|---|---|
| ***G06F 9/44*** | (2006.01) |
| ***G06Q 30/00*** | (2012.01) |
| ***G06F 21/00*** | (2013.01) |
| ***G06Q 30/02*** | (2012.01) |
| ***G06Q 30/04*** | (2012.01) |
| ***G06Q 40/00*** | (2012.01) |

(52) U.S. Cl.
CPC ......... *G06Q 30/0274* (2013.01); *G06Q 30/04* (2013.01); *G06Q 40/00* (2013.01)

(58) Field of Classification Search
None
See application file for complete search history.

(56) References Cited

U.S. PATENT DOCUMENTS

| | | | | |
|---|---|---|---|---|
| 5,469,553 | A * | 11/1995 | Patrick | 713/323 |
| 5,499,340 | A * | 3/1996 | Barritz | 714/47.1 |
| 6,029,145 | A * | 2/2000 | Barritz et al. | 705/34 |
| 6,233,564 | B1 * | 5/2001 | Schulze, Jr. | 705/14.19 |
| 6,381,735 | B1 * | 4/2002 | Hunt | 717/158 |
| 6,578,199 | B1 * | 6/2003 | Tsou et al. | 717/178 |
| 6,938,027 | B1 * | 8/2005 | Barritz et al. | 706/50 |

(Continued)

*Primary Examiner* — Erika Kretzmer
(74) *Attorney, Agent, or Firm* — Brundidge & Stanger, P.C.

(57) ABSTRACT

A method for attributing revenue for embedded software that displays advertising. The method includes the first step of determining the presence of more than one type of embedded software on a given client site. Then, the process assigns priority based on the length of time each type has resided on the client system and the source of each type, followed by classifying each software type, based on the history of present and predecessor copies of the software. A distribution factor is applied to each software type, based on the amount of advertising displayed by each software type and the length of time each software type has been installed. The partner revenue is distributed based on the distribution factor applied to each software type and a rate table.

20 Claims, 3 Drawing Sheets

(56) References Cited

U.S. PATENT DOCUMENTS

| | | | | |
|---|---|---|---|---|
| 7,051,315 | B2 * | 5/2006 | Artzi et al. | 717/103 |
| 7,103,643 | B1 * | 9/2006 | Jacobs et al. | 709/219 |
| 7,765,592 | B2 * | 7/2010 | Wang et al. | 726/22 |
| 8,645,941 | B2 * | 2/2014 | Goulden et al. | 717/170 |
| 2001/0032115 | A1 * | 10/2001 | Goldstein | 705/10 |
| 2002/0026390 | A1 * | 2/2002 | Ulenas et al. | 705/27 |
| 2002/0087717 | A1 * | 7/2002 | Artzi et al. | 709/236 |
| 2003/0115157 | A1 * | 6/2003 | Circenis | 705/400 |
| 2005/0086109 | A1 * | 4/2005 | McFadden et al. | 705/14 |
| 2005/0097088 | A1 * | 5/2005 | Bennett et al. | 707/3 |
| 2005/0155031 | A1 * | 7/2005 | Wang et al. | 717/170 |
| 2006/0235784 | A1 * | 10/2006 | Goulden et al. | 705/35 |
| 2006/0235965 | A1 * | 10/2006 | Bennett et al. | 709/224 |

* cited by examiner

ATTRIBUTING AND ALLOCATING ADVERTISING REVENUE FOR EMBEDDED SOFTWARE

CROSS-REFERENCE TO RELATED APPLICATIONS

This application is a continuation of U.S. patent application Ser. No. 11/368,858, now U.S. Pat. No. 8,645,941, filed on Mar. 6, 2006, which claims priority from U.S. Provisional Patent Application No. 60/659,682, filed on Mar. 7, 2005, wherein the contents of the above listed applications are hereby incorporated by reference.

BACKGROUND OF THE INVENTION

The present invention relates generally to the field of software marketing, and more particularly to the field of embedded software. Particular aspects of the present invention are described in the claims, specification and drawings.

Software lends itself to a number of distribution channels, apart from conventional sale or licensing of computer programs. One such channel is so-called shareware, in which a user is given a copy of the software, either in a demonstration, partially functional or fully functional version, and if the user wishes to continue using the product after a stated trial period, a license fee is paid to the producer. A variation on that theme is known as "freeware," where no fee at all is charged. These systems are most often utility programs and the like, produced by enthusiasts.

A relatively recent form of software distribution may be termed "embedded software." This term refers to situations in which a commercial entity seeks to gain some commercial advantage through a software installation on a user's computer, and it provides software desirable to the user to induce that use. The software desired by the user is bundled with software of interest to the distributor. A familiar example of this type is the Google toolbar, distributed by the Google search engine provider. Google distributes the toolbar, which offers several useful functionality features, including allowing a user to perform an internet search directly from the browser. Of course, the search is performed on Google, which benefits Google directly, but the user also gains in being able to perform rapid searching, as well as other features offered on the toolbar.

A number of U.S. Patent Applications filed by the assignee of the present invention address a form of this software, in which a behavior monitoring module is resident on a client computer. That module records the user's internet activity and reports that information via cookies to a host system. In return, distributors of the module provide utility applications such as screen savers and the like to the user. Examples or such applications include U.S. patent application Ser. No. 11/226,066, entitled "Method and Device for Publishing Cross-Network User Behavioral Data" filed on Sep. 14, 2005, published as U.S. 2006-0136528 A1 on Jun. 22, 2006, and issued as U.S. Pat. No. 7,693,863 on Apr. 6, 2010.

Such behavior monitoring applications can be used to provide targeted content, including advertising, to the user. Exposure of such advertising, as well as a user's response to the same, generates revenue from the host to the module's distributor. A problem can arise, however, when more than one such module is resident on a client computer. There, a revenue stream is generated, but attributing that revenue to a particular source is difficult. Most industry participants take the easy solution in this situation, eliminating any revenue participation by a second module.

That difficulty can have repercussions in the market. If, for example, a non-trivial number of client computers on which a given module is installed already have a module present, the resulting reduction of revenue may motivate a distributor against investing in such a marketing program.

A need exists, therefore, for a system for attributing revenue for such subscription-based software systems. The attribution must allow for multiple-module participation while remaining generally fair to the first-installed system. The method must also be easy to administer and capable of running from the module itself, which must recognize other modules within a client environment.

SUMMARY OF THE INVENTION

An aspect of the invention is a method for attributing revenue for embedded software. The method includes the first step of determining the presence of more than one type of embedded software on a given client site. Then, the process assigns priority based on the length of time each type has resided on the client system and the source of each type, followed by classifying each software type, based on the history of present and predecessor copies of the software. A distribution factor is applied to each software type, based on priority and classification, partner revenue is distributed based on the distribution factor applied to each software type.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
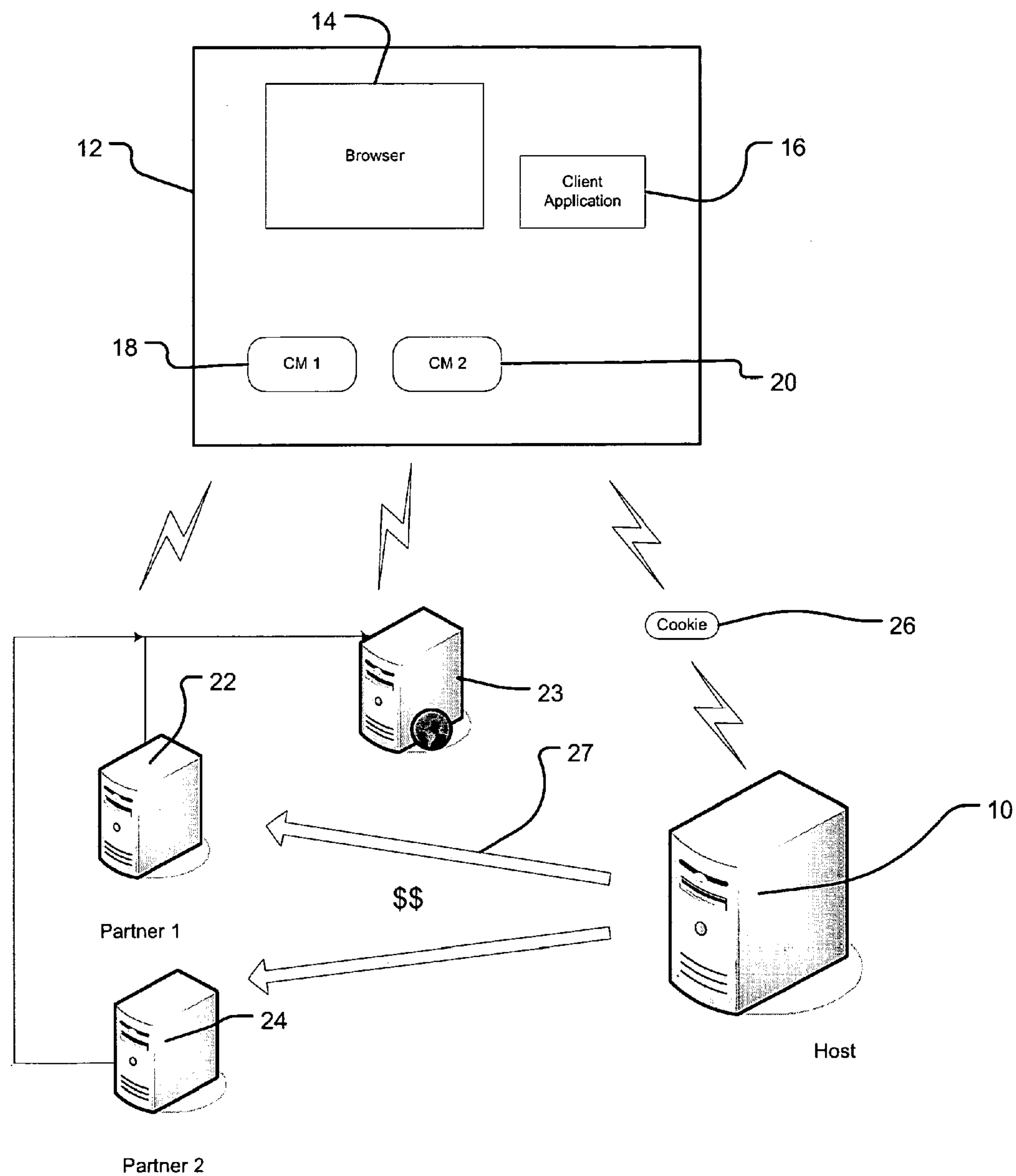
FIG. 1 illustrates the relationship between the host organization, partner distributors, and the client location.

FIG. 1 illustrates the interaction between various systems that characterizes the environment of the present invention. There, a host 10 is the producer of client modules, such as resident modules CM1 and CM2, identified as items 18 and 20, which are resident on a client system 12. Here, a client system can refer to any computer, but most specifically a computer on which an internet browser 14 operates. It should be clear that the definition of client systems and browsers is very broad, encompassing any computing device capable of accessing the internet, as well as the range of browsers from Firefox and Opera to Microsoft Internet Explorer. That breadth is intentional, as the field for the present invention is as wide as the internet.

Here, two client modules are resident on the client system, distributed by firms other than Host, here designated Partner 1 (item 22) and Partner 2 (item 24). Following the normal practice in the industry, the partners may distribute software directly to the user, or software may be provided to a website 23 operated by some third party, who then distributes the software to the user.

As noted above, the package distributed to the client computer includes a client application 16 that is of interest to the user. This may be a screen saver, system utility or game, or other. Of interest to the supplier is the module CM1 or CM2, which may offer functionality of direct benefit to the supplier, such as providing a toolbar that directs traffic to the partner's site. Of indirect benefit are modules that provide customer information. Typically such information is gathered and collated by the client module, and it may be periodically transmitted to the host in a cookie 26 or via direct data transmission. Typical of such applications is the system described in U.S. patent application Ser. No. 11/226, 066, entitled "Method and Device for Publishing Cross-Network User Behavioral Data" filed on Sep. 14, 2005, published as U.S. 2006-0136528 A1 on Jun. 22, 2006, and issued as U.S. Pat. No. 7,693,863 on Apr. 6, 2010.

Data provided to the Host system results in some revenue-generating action. A straightforward application might be the display of advertising material on the user's desktop, for example. The Host could be compensated based on the number of advertisements displayed, the number of click-throughs generated, or some other metrics. Those details are known in the art and form no part of the present invention. For purposes of explaining operation of the present invention, it suffices to note that revenue is generated.

As a result of the activity reported by the client modules to Host 10, the latter directs a revenue stream 27 to each partner. In this instance, however, it is difficult to determine which partner should receive what revenue, owing to the presence of two client modules on the client computer. It should be noted that the number of modules present may not be limited to two. If the user is active on the internet, it is possible that a number of modules will have been introduced to the same client computer, along with various utility applications. The process described below will deal with any number of modules present in a single client system.

Figure 2:
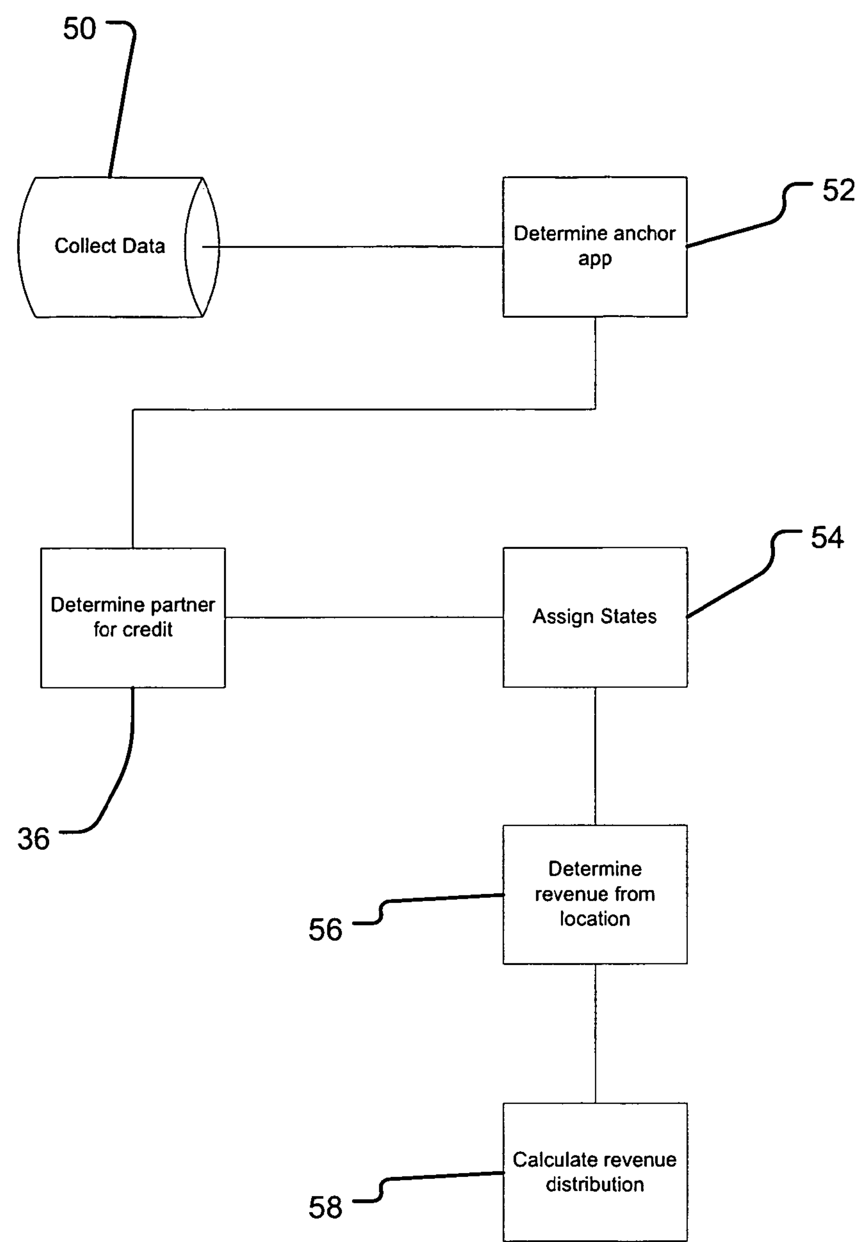
FIG. 2 depicts and embodiment of a process for allocating and attributing a revenue stream related to subscription-based software.

A process for attributing the revenue associated with several client modules is shown in FIG. 2. As seen there, the first step 50 is to collect data, accomplished by receiving and processing cookies 26 or transmissions in a known manner. Each client computer is assigned a unique ID number, which identifies a computer without including any individual-specific data about the user. Similarly, cookies identify the client module providing the data, which in turn allows the Host company to identify the partner responsible for that module. Alternatively, the modules can communicate data directly to Host as desired, as is known in the art. Thus, in the course of processing the data it will become apparent that certain data are originating from the same computer but from different client modules.

The system then proceeds to determine the "anchor" applications on a particular client computer, in step 52. This determination involves a check of the tenure of each module on the particular system, and the underlying rationale is that splitting revenue among partners who contributed regarding a particular client system is important, but each partner should only be represented once, even when multiple applications are running. That data is available at the Host, which can quickly determine which applications from a particular partner have been on the client system the longest. Those applications are deemed "anchor" applications, and they are used for further calculation of attribution rates. Generally the process of assigning anchor applications reduces the number of revenue contestants to two, though there may be a higher number in particular circumstances.

Figure 3:
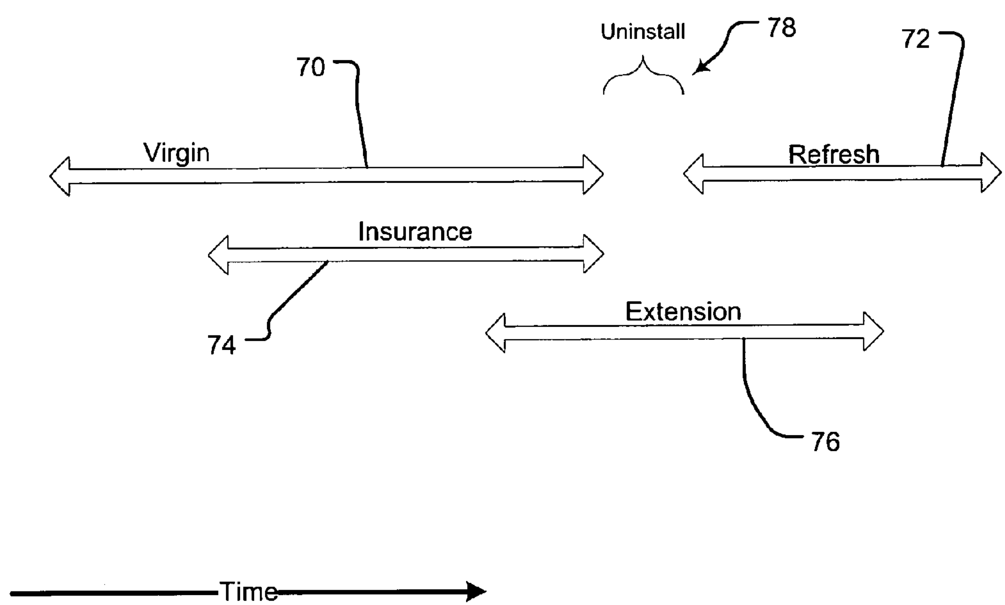
FIG. 3 depicts a schema for designating application states based on tenure and environment in a client location.

Next, in step 54, each anchor application is assigned a state. State criteria are best seen in FIG. 3, which makes clear that the rationale for various states is to recognize and reward the various roles played by applications installed at various times. In this drawing, time is the horizontal dimension, with various module versions being resident on the specific client computer for the times indicated.

The most obvious state is state 70, labeled "virgin". This state occurs when a module is the first application installed on a machine. This event is of course particularly valuable, and that status is rewarded accordingly.

Addition of a second module is an event that must be treated as significant, however, even though a first module is then operable, for the reasons discussed above. In the example shown, a second application 74 is installed at some time after the "virgin" application 70. The new application will not gather any more information regarding monetization than does the existing one, so it is classified as an "insurance" application. That is, the information it provides is recognized as duplicative as long as the "virgin" application continues to function, but the importance of having that application in place is recognized and compensated.

FIG. 3 also illustrates a common event in the history of client application modules, namely the likelihood that at some point all existing applications will be uninstalled. Whether the uninstall results from a system crash, or reconfiguration, or other action, the result is the same—at least some existing application modules disappear, and no further data is forthcoming from the client location, as shown at the gap labeled "uninstall" and indicated by arrow 78.

Here, if one of the existing "insurance" applications may survive the uninstall of other applications, so that location coverage actually continues uninterrupted, in spite of the loss of the "virgin" application and possible one or more "insurance" applications. Such an application is termed an "extension" application 76.

In the event that no "extension" application is present, another application may be installed at some time after the uninstall event. Such an application is labeled a "refresh" application 72, to distinguish it from a "virgin" application that is installed at a location never before covered by a Host application.

Next, as shown in step 56, the revenue associated with a particular location must be determined. The exact methods for performing that calculation will vary depending on the particular business involved, as will be understood by those in the art. In the example of a system that monitors user behavior and participates in an advertising system, revenue might be calculated on a sum of set rates per impression, per click-through, and per transaction that results in a purchase. Many other combinations of factors are known in the industry. The result of any such calculation is a total that represents the amount of revenue generated by a specific location for the time period involved, the latter most generally being a month.

With the total revenue figure in hand, the share of that revenue that is paid to the partner responsible for generating that revenue is determined, in step 58. Almost invariably, the details of any such division will be governed by the specific contract between the parties. Some generalization is possible, however, in setting out the present solution to the problem described above. Rather than a set rate, which has been a norm, parties following the present invention can set out a rate schedule based on the state of the client application. Based on the classifications set out in FIG. 3, a partner could be allocated a share of revenue based on Table 1. TABLE-U.S.-00001 TABLE 1 Revenue Share vs. Application State Virgin Extension/Refresh Insurance 50% 30% 10%

As might be expected, a partner receives the highest revenue share for a "virgin" state, one which is opened for the first time. A reduced rate, but still substantial, is paid for an "extension" or "refresh" state, as those situations remains productive. Unlike any previous systems, however, the present invention allows for payment in the "insurance" state, in which the particular application is completely redundant. The utility of having a backup system, and for incenting partners to continue their placement programs, produces significant market advantages in terms of the actual number of systems in the field and operating at any given time.

Those in the art will appreciate that a number of variations are possible on the general principles set out here. While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method, comprising:

determining a first revenue distribution factor for a client computer system based at least in part on a first amount of advertising displayed on a client computer via a first embedded software installed on the client computer at a first date, the first embedded software associated with a first partner;

determining a second revenue distribution factor for the client computer system based at least in part on a second amount of advertising displayed on the client computer via a second embedded software installed on the client computer at a second date, the second embedded software associated with a second partner, wherein the second date is after the first date, and wherein the second embedded software is a duplicate of the first embedded software; and distributing partner revenue based at least in part on the first and second revenue distribution factors and a rate schedule.

2. The method of claim 1, wherein the rate schedule is configured to distribute a first share of the partner revenue based on a first instance of embedded software.

3. The method of claim 2, wherein the rate schedule is further configured to distribute a second share of the partner revenue based on other embedded software which remained in response to an uninstallation of the first embedded software.

4. The method of claim 3, wherein the rate schedule is further configured to distribute a third share of the partner revenue based on duplicative embedded software of the first embedded software.

5. The method of claim 4, wherein the duplicative embedded software of the first embedded software is installed after uninstallation of previous duplicative embedded software of the first embedded software on the client computer system.

6. The method of claim 3, wherein the first share of the partner revenue is larger than the second share of the partner revenue.

7. The method of claim 4, wherein the second share of the partner revenue is larger than the third share of the partner revenue.

8. An apparatus, comprising:

a host computer configured to:

determine a first revenue distribution factor for a client computer system based at least in part on a first amount of advertising displayed on a client computer via a first embedded software installed on the client computer at a first date, the first embedded software associated with a first partner;

determine a second revenue distribution factor for the client computer system based at least in part on a second amount of advertising displayed on the client computer via a second embedded software installed on the client computer at a second date, the second embedded software associated with a second partner, wherein the second date is after the first date, and wherein the second embedded software is a duplicate of the first embedded software; and distribute partner revenue based at least in part on the first and second revenue distribution factors and a rate schedule.

9. The apparatus of claim 8, wherein the rate schedule is configured to distribute a first share of the partner revenue based on a first instance of embedded software.

10. The apparatus of claim 9, wherein the rate schedule is further configured to distribute a second share of the partner revenue based on other embedded software which remained in response to an uninstallation of the first embedded software.

11. The apparatus of claim 10, wherein the rate schedule is further configured to distribute a third share of the partner revenue based on duplicative embedded software of the first embedded software.

12. The apparatus of claim 11, wherein the duplicative embedded software of the first embedded software is installed after uninstallation of previous duplicative embedded software of the first embedded software on the client computer system.

13. The apparatus of claim 10, wherein the first share of the partner revenue is larger than the second share of the partner revenue.

14. The apparatus of claim 11, wherein the second share of the partner revenue is larger than the third share of the partner revenue.

15. A non-transitory computer-readable medium storing executable instructions that, when executed, cause a computer to perform operations comprising:

determining a first revenue distribution factor for a client computer system based at least in part on a first amount of advertising displayed on a client computer via a first embedded software installed on the client computer at a first date, the first embedded software associated with a first partner;

determining a second revenue distribution factor for the client computer system based at least in part on a second amount of advertising displayed on the client computer via a second embedded software installed on the client computer at a second date, the second embedded software associated with a second partner, wherein the second date is after the first date, and wherein the second embedded software is a duplicate of the first embedded software; and distributing partner revenue based at least in part on the first and second revenue distribution factors and a rate schedule.

16. The non-transitory computer-readable medium of claim 15, wherein the rate schedule is configured to distribute a first share of the partner revenue based on a first instance of embedded software.

17. The non-transitory computer-readable medium of claim 16, wherein the rate schedule is further configured to distribute a second share of the partner revenue based on other embedded software which remained in response to an uninstallation of the first embedded software.

18. The non-transitory computer-readable medium of claim 17, wherein the rate schedule is further configured to distribute a third share of the partner revenue based on duplicative embedded software of the first embedded software.

19. The non-transitory computer-readable medium of claim 18, wherein the duplicative embedded software of the first embedded software is installed after uninstallation of previous duplicative embedded software of the first embedded software on the client computer system.

20. The non-transitory computer-readable medium of claim 17, wherein the first share of the partner revenue is larger than the second share of the partner revenue; and wherein the second share of the partner revenue is larger than the third share of the partner revenue.

* * * * *